(12) United States Patent
Poirier, IV et al.

(10) Patent No.: US 12,242,578 B2
(45) Date of Patent: Mar. 4, 2025

(54) SYSTEMS AND METHODS FOR USING IDENTIFIERS OF ENROLLMENT SYSTEMS FOR USER AUTHENTICATION

(71) Applicant: Aetna Inc., Hartford, CT (US)

(72) Inventors: John Poirier, IV, Hartford, CT (US); Abbie Barbir, Hartford, CT (US); Erick Verry, Hartford, CT (US); Victoria L. Garstka, Hartford, CT (US); Cisa Kurian, Hartford, CT (US); Amy Ulrich, Hartford, CT (US)

(73) Assignee: Aetna Inc., Hartford, CT (US)

( * ) Notice: Subject to any disclaimer, the term of this patent is extended or adjusted under 35 U.S.C. 154(b) by 328 days.

(21) Appl. No.: 17/500,816

(22) Filed: Oct. 13, 2021

(65) Prior Publication Data

US 2023/0115383 A1  Apr. 13, 2023

(51) Int. Cl.
*G06F 21/32* (2013.01)
*H04L 9/40* (2022.01)

(52) U.S. Cl.
CPC .......... *G06F 21/32* (2013.01); *H04L 63/0861* (2013.01); *H04L 63/102* (2013.01); *G06F 2221/2149* (2013.01)

(58) Field of Classification Search
CPC ............. G06F 21/32; G06F 2221/2141; H04L 63/0861; H04L 63/10–107
See application file for complete search history.

(56) References Cited

U.S. PATENT DOCUMENTS

| | | | |
|---|---|---|---|
| 7,310,042 B2 | 12/2007 | Seifert | |
| 7,552,333 B2 | 6/2009 | Wheeler et al. | |
| 8,171,528 B1 | 5/2012 | Brown | |
| 10,056,084 B2 | 8/2018 | Aviles-Casco et al. | |
| 10,637,853 B2 | 4/2020 | Lindemann | |
| 11,569,991 B1* | 1/2023 | Griffin | H04L 9/0844 |
| 2002/0035542 A1 | 3/2002 | Tumey et al. | |
| 2015/0074774 A1* | 3/2015 | Nema | H04L 63/062 726/5 |
| 2017/0200151 A1* | 7/2017 | Bruno | H04W 12/068 |
| 2018/0151182 A1 | 5/2018 | Wyss et al. | |
| 2018/0285556 A1 | 10/2018 | Beatson et al. | |

(Continued)

FOREIGN PATENT DOCUMENTS

| | | |
|---|---|---|
| DE | 10150108 A1 | 4/2003 |
| KR | 20200092368 A | 8/2020 |

*Primary Examiner* — Madhuri R Herzog
(74) *Attorney, Agent, or Firm* — Leydig, Voit & Mayer, Ltd.

(57) ABSTRACT

A method for authenticating a user is provided. The method comprises: providing first biometric enrollment data of the user to a first enrollment system of a plurality of enrollment systems; receiving a first enrollment identifier identifying the first enrollment system; storing the first enrollment identifier identifying the first enrollment system into a digital wallet of the user; in response to a request to access content on a relying party system, providing a biometric marker of the user and the first enrollment identifier from the digital wallet of the user to the relying party system; based on the relying party system identifying the first enrollment system using the first enrollment identifier and verifying the biometric marker of the user with the first enrollment system, accessing the requested content associated with the relying party system.

20 Claims, 5 Drawing Sheets

(56) References Cited

U.S. PATENT DOCUMENTS

| | | |
|---|---|---|
| 2018/0287792 A1 | 10/2018 | Fu |
| 2019/0364040 A1* | 11/2019 | Milgramm .............. G06F 21/32 |
| 2020/0334930 A1 | 10/2020 | Masood |
| 2021/0073826 A1* | 3/2021 | Garrett ................. G06Q 20/351 |
| 2022/0277295 A1* | 9/2022 | Robinson-Morgan ....................... G06Q 20/40145 |

* cited by examiner

SYSTEMS AND METHODS FOR USING IDENTIFIERS OF ENROLLMENT SYSTEMS FOR USER AUTHENTICATION

BACKGROUND

User credentials are more at risk of being stolen than ever before and when they are stolen, it may create serious hardships for a user. Traditionally, biometrics of the user may be used for authenticating the user. For instance, biometrics may include a user's voice, fingerprint, facial scan, iris scan, and so on. In particular, a smart speaker (e.g., an internet-of-things (IoT) smart speaker) may record a voice recording of the user for biometric voice authentication. Multiple enrollment systems may be used for user authentication. For example, the user may use a first enrollment system for voice authentication and a second enrollment system for facial identification. Furthermore, the user may enroll into multiple enrollment systems for a single type of authentication such as voice authentication. For instance, to log onto a streaming service, the user may use a particular enrollment system and to log onto a grocery delivery service, the user may use another enrollment system. Each time the user enrolls into an enrollment system, the user provides personal and private information (e.g., the user's voice or facial scan) to the enrollment system, which may be stolen by unauthorized entities. Accordingly, there remains a technical need to reduce the number of enrollment systems used by a user to reduce the risk of user credentials being stolen.

SUMMARY

In some examples, the present application provides a method and system for using identifiers of enrollment systems for user authentication. For example, a user may seek to gain access to one or more services provided by one or more relying party systems. For instance, a first relying party system may provide a first service such as a grocery-pick up service and a second relying party system may provide a second service such as a prescription service. Instead of each relying party system using a particular enrollment system, the user device may provide an identifier indicating an enrollment system that already has enrolled the user. As such, this provides more control to the user regarding their own personal information. In particular, using a user device, the user may enroll into one or more enrollment systems. For instance, the user may enroll into voice authentication with a first enrollment system, and the first enrollment system may provide a first identifier indicating that the user has enrolled into voice authentication with the first enrollment system. The user may further enroll into facial identification with a second enrollment system, and the second enrollment system may provide a second identifier indicating that the user has enrolled into facial identification with the second enrollment system. The user device may store the first and second identifiers into a digital wallet. The digital wallet may be within the user device itself or on a cloud network (e.g., cloud computing system).

After enrollment, the user may seek to access one or more services that are operating on one or more relying party systems associated with one or more enterprise organizations. For instance, the user may seek to access a grocery pick-up service. The relying party system for the grocery pick-up service may provide a prompt indicating for the user to select an authentication method (e.g., voice or facial authentication). The user may select an authentication method and the user device may retrieve the identifier associated with the authentication method from the digital wallet as well as provide the identifier to the relying party system. For instance, the user may select voice authentication and the user device may retrieve the first identifier indicating the user enrolled into voice authentication with the first enrollment system and provide the first identifier to the relying party system. The relying party system may use the identifier, and communicate with the first enrollment system to authenticate the user. Based on the authentication, the user may gain access to content on the relying party system (e.g., order and pick-up their groceries).

In one aspect, a method for authenticating a user is provided. The method comprises: providing, by a user device, first biometric enrollment data of the user to a first enrollment system of a plurality of enrollment systems; receiving, by the user device and from the first enrollment system, a first enrollment identifier identifying the first enrollment system, wherein each of the plurality of enrollment systems is associated with a unique enrollment identifier; storing, by the user device, the first enrollment identifier identifying the first enrollment system into a digital wallet of the user; in response to a request to access content on a relying party system, providing, by the user device, a biometric marker of the user and the first enrollment identifier from the digital wallet of the user to the relying party system; and based on the relying party system identifying the first enrollment system using the first enrollment identifier and verifying the biometric marker of the user with the first enrollment system, accessing, by the user device, the requested content associated with the relying party system.

In some instances, the method further comprises: providing second biometric enrollment data of the user to a second enrollment system of the plurality of enrollment systems; receiving, by the user device and from the second enrollment system, a second enrollment identifier identifying the second enrollment system, wherein the second enrollment system is different from the first enrollment system; and storing, by the user device, the second enrollment identifier identifying the second enrollment system into the digital wallet of the user.

In some examples, the first biometric enrollment data is associated with a first biometric verification process and the second biometric enrollment data is associated with a second biometric verification process, wherein the first biometric verification process is different from the second biometric verification process.

In some variations, the first biometric verification process is a voice verification process. In some instances, the first biometric verification process is a fingerprint verification process. In some examples, the first biometric verification process is a facial recognition verification process. In some variations, the first biometric verification process is an eye scan verification process.

In some instances, the method further comprises: causing, by the user device, display of a list of biometric verification processes; receiving a user selection of a biometric verification process from the list of biometric verification processes; and retrieving, by the user device, the first enrollment identifier from the digital wallet, wherein providing the biometric marker and the first enrollment identifier to the relying party system is based on retrieving the first enrollment identifier from the digital wallet.

In some examples, the digital wallet is within a trusted platform module (TPM) of the user device. In some variations, the digital wallet is within a cloud computing system.

In another aspect, a system comprising a user device and a first enrollment system is provided. The user device is configured to: receive, from the first enrollment system, a first enrollment identifier identifying the first enrollment system, wherein each of the plurality of enrollment systems is associated with a unique enrollment identifier; store the first enrollment identifier identifying the first enrollment system into a digital wallet of the user; in response to a request to access content on a relying party system, provide a biometric marker of the user and the first enrollment identifier from the digital wallet of the user to the relying party system; and based on the relying party system identifying the first enrollment system using the first enrollment identifier and verifying the biometric marker of the user with the first enrollment system, access the requested content associated with the relying party system. The first enrollment system is configured to: receive the first biometric enrollment data of the user; generate the first enrollment identifier based on the first biometric enrollment data; and provide the first enrollment identifier to the user device.

In some instances, the user device is further configured to: provide second biometric enrollment data of the user to a second enrollment system of the plurality of enrollment systems; receive, from the second enrollment system, a second enrollment identifier identifying the second enrollment system, wherein the second enrollment system is different from the first enrollment system; and store the second enrollment identifier identifying the second enrollment system into the digital wallet of the user.

In some examples, the first biometric enrollment data is associated with a first biometric verification process and the second biometric enrollment data is associated with a second biometric verification process, wherein the first biometric verification process is different from the second biometric verification process.

In some variations, the first biometric verification process is a voice verification process. In some instances, the first biometric verification process is a fingerprint verification process. In some examples, the first biometric verification process is a facial recognition verification process. In some variations, the first biometric verification process is an eye scan verification process.

In some examples, the digital wallet is within a trusted platform module (TPM) of the user device. In some variations, the digital wallet is within a cloud computing system.

In yet another aspect, a user device is provided. The user device comprises one or more processors and a non-transitory computer-readable medium having processor-executable instructions stored thereon. The processor-executable instructions, when executed by the one or more processors, facilitate: providing first biometric enrollment data of the user to a first enrollment system of a plurality of enrollment systems; receiving, from the first enrollment system, a first enrollment identifier identifying the first enrollment system, wherein each of the plurality of enrollment systems is associated with a unique enrollment identifier; storing the first enrollment identifier identifying the first enrollment system into a digital wallet of the user; in response to a request to access content on a relying party system, providing a biometric marker of the user and the first enrollment identifier from the digital wallet of the user to the relying party system; and based on the relying party system identifying the first enrollment system using the first enrollment identifier and verifying the biometric marker of the user with the first enrollment system, accessing the requested content associated with the relying party system.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
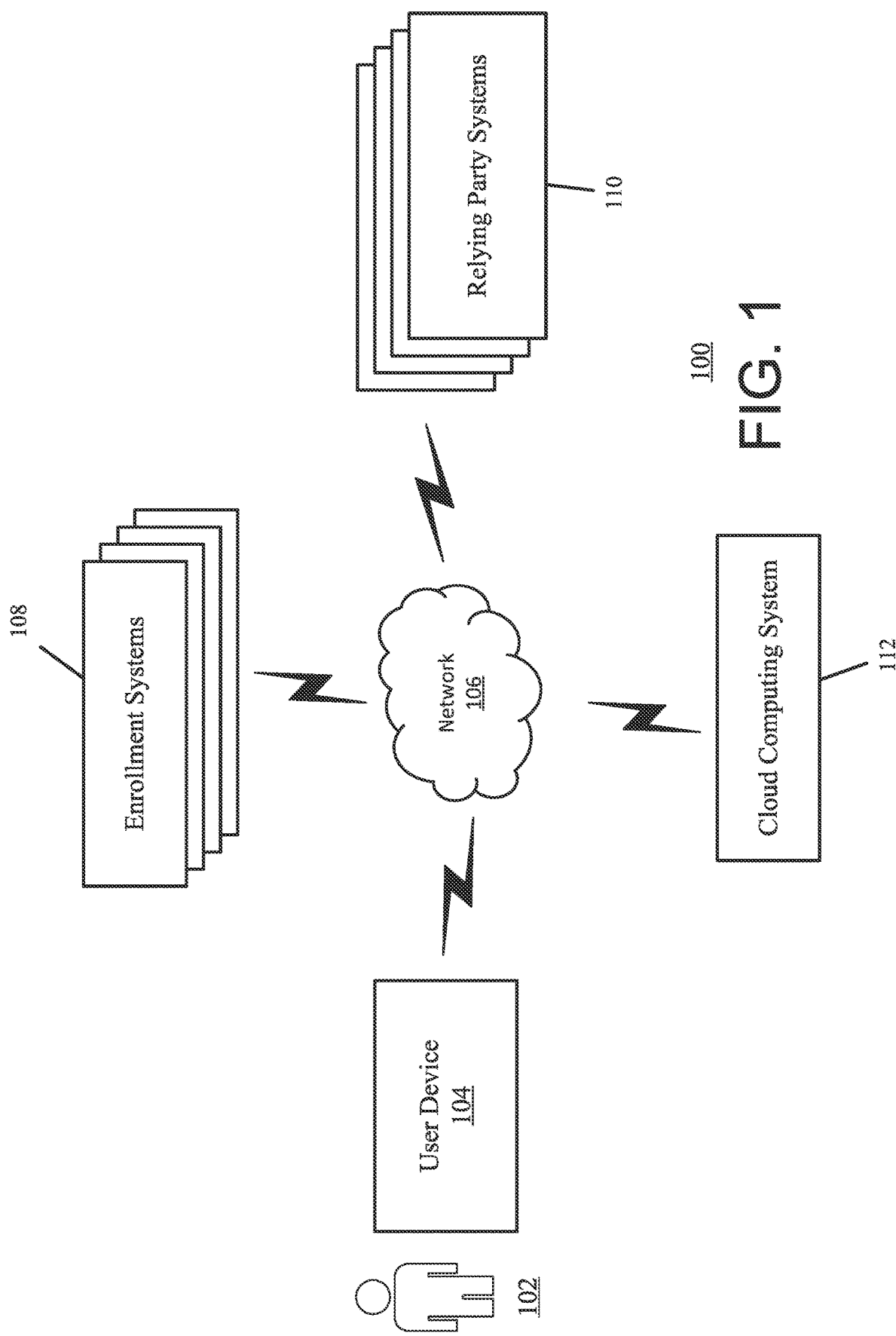
FIG. 1 is a simplified block diagram depicting an exemplary computing environment in accordance with one or more examples of the present application.

Systems, methods, and computer program products are herein disclosed that provide for using identifiers of enrollment systems for user authentication (e.g., biometric voice authentication). FIG. 1 is a simplified block diagram depicting an exemplary environment in accordance with an example of the present application. The environment 100 includes a user 102, a user device 104 (e.g., a computing device), a network 106, a plurality of enrollment systems 108, one or more relying party systems 110, and a cloud computing system 112. Although certain entities within environment 100 may be described below and/or depicted in the FIGs. as being singular entities, it will be appreciated that the entities and functionalities discussed herein may be implemented by and/or include one or more entities. For instance, the entities of environment 100 may include a plurality of computing devices, systems, platforms, and/or servers.

The entities within the environment 100 such as the user device 104 (e.g., a computing device), the enrollment systems 108, the cloud computing system 112, and/or the relying party systems 110 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with the user device 104. For instance, the user 102 may be located in a particular location and may use the user device 104 to access content associated with an enterprise organization. The user device 104 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The user device 104 may be able to execute software applications and/or programs. Additionally, and/or alternatively, the user device 104 may be configured to operate a web browser to connect to a web page and/or operate an application hosted and/or managed by the enterprise organization. The enterprise organization may be any type of corporation, company, organization, and/or other institution that provides one or more goods and/or services. For instance, the enterprise organization may provide multiple different services such as a grocery pick-up service, a prescription pick-up service (e.g., the enterprise organization may provide prescriptions/medications to the user 102), an insurance service (e.g., the enterprise organization may provide insurance to the user 102), a healthcare service, a streaming service, and/or other services.

Each enrollment system 108 is a computing system that enrolls users into one or more authentication methods or processes (e.g., verification processes). Each enrollment system 108 includes and/or is implemented using one or more computing devices, computing platforms, cloud computing platforms, systems, servers, and/or other apparatuses capable of hosting and/or managing the web pages, programs, and/or applications. For example, the enrollment system 108 may communicate with the user device 104 to enroll the user 102 into biometric verification such as voice verification. In particular, the enrollment system 108 may provide a prompt to the user device 104 to provide a voice recording of the user 102. The user 102 may provide the voice recording, and the user device 104 may provide the voice recording to the enrollment system 108. Based on receiving the voice recording, the enrollment system 108 may enroll the user 102 into voice authentication. In other words, the enrollment system 108 may use the received voice recording to authenticate the user 102 (e.g., by comparing the received voice recording with a new voice recording of the user 102). When the user 102 is authenticated, the user 102 may access content associated with one or more relying party systems 110 (e.g., order groceries via a grocery pick-up service).

After enrolling the user 102 into voice authentication, the enrollment system 108 may provide an identifier to the user device 104. The identifier may indicate the enrollment system 108 that authenticated the user and/or the verification method. For instance, the identifier may indicate that the verification method is voice verification and the particular enrollment system (e.g., a first enrollment system) that authenticated the user. The identifier may be a bit string or any type of unique set of bits and/or other types of data that is reproducible. In some instances, the identifier may be a bit string that is able to identify the user 102 as well as the enrollment system 108. In some examples, the identifier may further include and/or indicate additional information such as a verification type (e.g., voice verification). In other words, each enrollment system 108 may enroll the user 102 into one or more types of verification methods/processes. The verification methods include, but are not limited to, voice verification, fingerprint verification, eye or iris verification, facial verification, other types of biometric verification, and/or other types of verification methods (e.g., a picture of the user 102 and their family member).

After receiving the identifier, the user device 104 may store the identifier in a digital wallet. The digital wallet may be a storage location within the user device 104 and/or in a cloud computing network (e.g., the cloud computing system 112).

The environment 100 includes a plurality of enrollment systems 108. Each of the enrollment systems 108 may provide an identifier that identifies themselves as well as one or more verification methods that they use. For instance, a first subset of enrollment systems 108 (e.g., one or more enrollment systems 108) may use voice verification, a second subset of enrollment systems may use fingerprint verification, a third subset of enrollment systems 108 may use facial verification, and so on. In some instances, a single enrollment system 108 may provide for one or more verification methods. For instance, an enrollment system 108 may enroll the user 102 into voice verification as well as fingerprint verification.

In some examples, for voice authentication, the enrollment system 108 may use a voice recreation recipe. For instance, the voice recreation recipe is and/or includes one or more algorithms and/or mathematical transformations such that it may provide an output from a voice of the user that is then used to determine the authenticity of the user. For example, the voice recreation recipe may be used to determine the pitch, tone, frequency, and/or other identifiers associated with a user's voice. The enrollment system 108 may provide the voice recreation recipe to the user device 104. Using the voice recreation recipe, the user device 104 generates one or more voice enrollment patterns based on inputting the voice of the user 102 into the voice recreation recipe. The voice enrollment patterns include certain identifiers and/or algorithmic or mathematical information associated with the voice of the user 102. After, the user device 104 provides one or more enrollment patterns to the enrollment system 108. The enrollment system 108 receives the one or more enrollment patterns and aggregates them together to determine voice descriptors. The enrollment system 108 then provides an identifier indicating the verification method (e.g., voice authentication using a voice enrollment recipe) and the enrollment system 108 that enrolled the user 102 to the user device 104. The user device 104 stores the identifier in a digital wallet such as a storage location within the user device 104 and/or within the cloud computing platform (e.g., the cloud computing system 112).

Each relying party system 110 is a computing system that hosts, operates, manages, and/or otherwise is associated with providing one or more services. Each relying party system 110 includes and/or is implemented using one or more computing devices, computing platforms, cloud computing platforms, systems, servers, and/or other apparatuses capable of hosting and/or managing the web pages, programs, and/or applications. For example, the relying party system 110 may provide a service for the enterprise organization and may seek to ensure the user 102 is verified (e.g., authenticated) prior to providing that service to the user 102. The relying party system 110 may forward a prompt to the user device 104 that prompts the user 102 as to how the user 102 would like to authenticate themselves. The user 102 may select a verification method such as voice verification.

Based on selecting the verification method, the user device 104 may retrieve an identifier associated with the verification from the digital wallet. For instance, the user device 104 may retrieve an identifier indicating the voice verification and/or a particular enrollment system 108 that the user 102 has enrolled into voice verification previously. Then, the user device 104 may provide the identifier to the relying party system 110. The relying party system 110 may determine the enrollment system 108 indicated by the identifier and then communicate with the determined enrollment system 108 to verify the user 102. For example, along with the identifier, the user device 104 may direct the user 102 to speak and record another voice recording of the user 102, and provide the voice recording to the relying party system 110. The relying party system 110 may provide the voice recording to the determined enrollment system 108. The enrollment system 108 may authenticate the user 102 using the voice recording and then provide an indication indicating whether the user 102 is authenticated to the relying party system 110. This will be described in further detail below.

The environment 100 may include a plurality of relying party systems 110, and each relying party system 110 may provide one or more services. For instance, a single relying party system 110 may provide a first service (e.g., grocery pick-up service) and a second service (e.g., prescription pick-up service). Additionally, and/or alternatively, the relying party system 110 may provide a single service (e.g., an insurance service).

The cloud computing system 112 is a cloud computing platform that includes and/or is implemented using one or more computing devices, computing platforms, systems, servers, and/or other apparatuses capable of storing information associated with the user 102. For instance, the cloud computing system 112 may include a storage location dedicated to the user 102 and used for storing a digital wallet for the user 102. The user device 104 may provide the identifiers from the enrollment systems 108 to the cloud computing system 112 and the cloud computing system 112 may store the identifiers in the cloud computing system 112.

In some instances, the enrollment systems 108, the relying party systems 110, the cloud computing system 112, and/or other entities within the environment 100 may be implemented as engines, software functions, and/or applications. In other words, the functionalities of the enrollment systems 108 and/or the relying party systems 110 may be implemented as software instructions stored in storage (e.g., memory) and executed by one or more processors.

It will be appreciated that the exemplary environment depicted in FIG. 1 is merely an example, and that the principles discussed herein may also be applicable to other situations—for example, including other types of institutions, organizations, devices, systems, and network configurations. For example, in some variations, the functionalities of each of the enrollment systems 108, the cloud computing system 112, and each of the relying party systems 110 may be separated into multiple different entities. For instance, a relying party system 110 may have a first system (e.g., a first computing system and/or platform) that authenticates the user device 104 using the information from the enrollment system 108. The relying party system 110 may further have a second, separate system (e.g., a second computing system and/or platform) that provides the requested content to the user device 104 based on the authentication.

Figure 2:
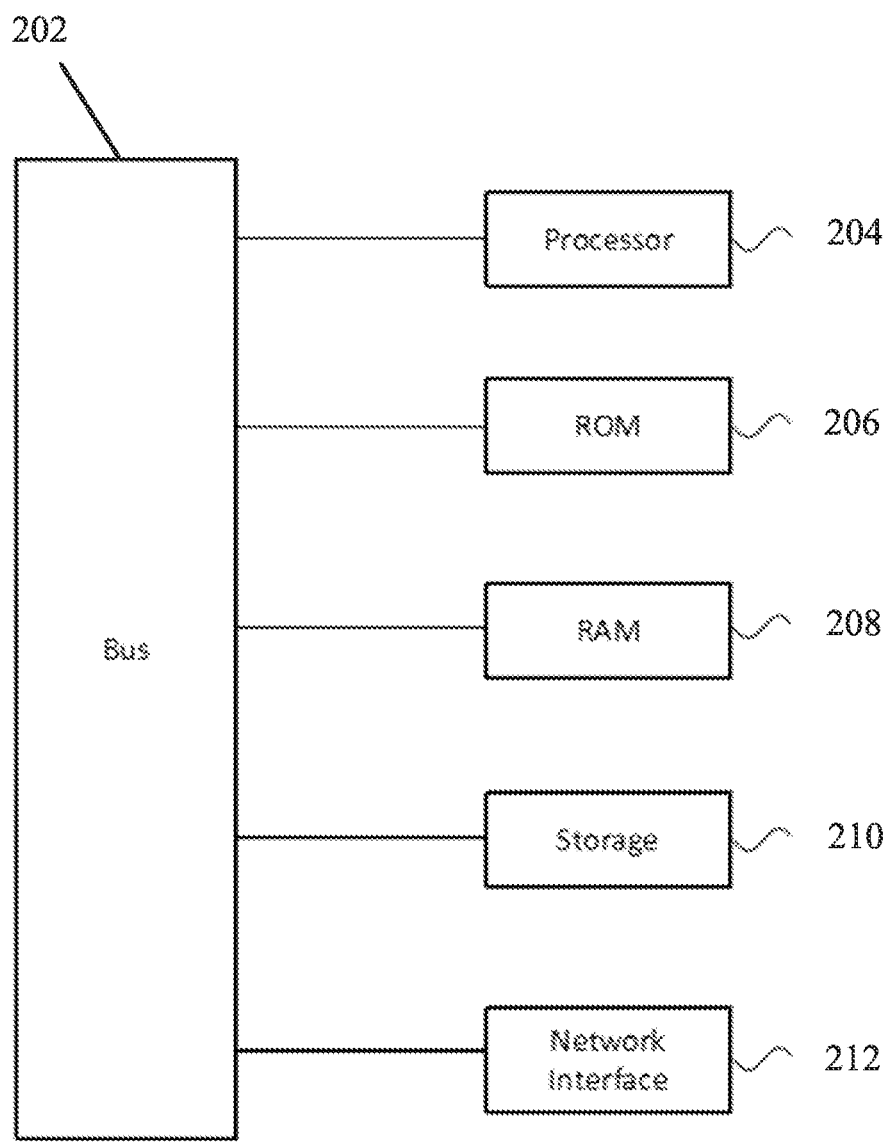
FIG. 2 is a simplified block diagram of one or more devices or systems within the exemplary environment of FIG. 1.

FIG. 2 is a block diagram of an exemplary system and/or device 200 (e.g., the user device 104, an enrollment system of the enrollment systems 108, a relying party system of the relying party systems 110, and/or the cloud computing system 112) within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. Additionally, and/or alternatively, the device/system 200 may further include components that might not be included within every entity of environment 100.

Figure 3:
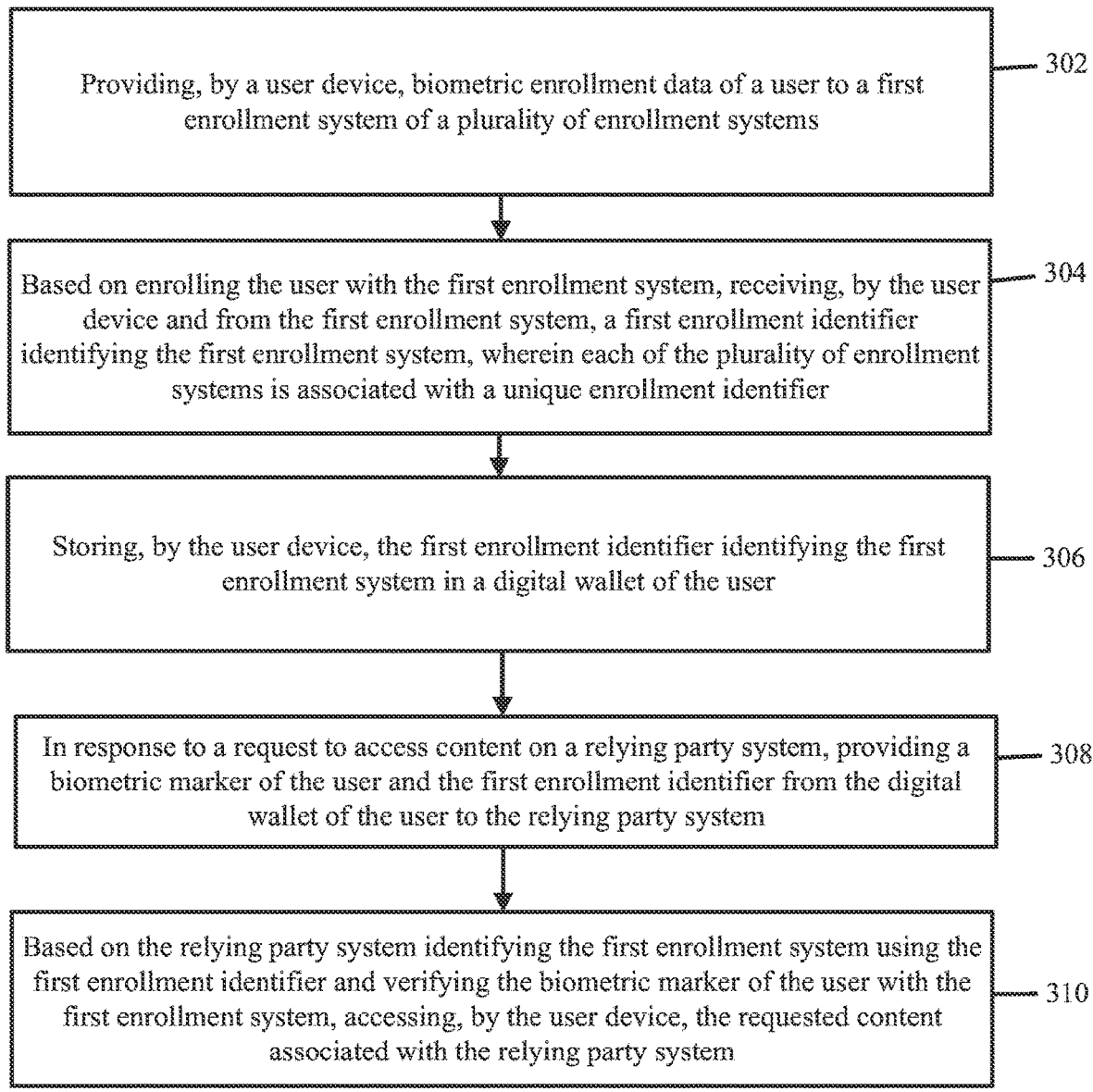
FIG. 3 is an exemplary process for using identifiers of enrollment systems for user authentication in accordance with one or more examples of the present application.

FIG. 3 is an exemplary process 300 for using identifiers of enrollment systems for user authentication in accordance with one or more examples of the present application. The process 300 may be performed by the user device 104 of environment 100 shown in FIG. 1. It will be recognized that any of the following blocks may be performed in any suitable order, and that the process 300 may be performed in any suitable environment. The descriptions, illustrations, and processes of FIG. 3 are merely exemplary and the process 300 may use other descriptions, illustrations, and processes for using a voice recreation recipe for user authentication.

In operation, at block 302, the user device 104 provides biometric enrollment data of a user 102 to a first enrollment system of a plurality of enrollment systems 108. For example, the user 102 may seek to gain access to certain services that require biometric verification to verify the identity of the user 102. For instance, as mentioned above, the biometric verification may include, but is not limited to, voice verification, facial scan verification, eye or iris verification, fingerprint verification, and so on. The first enrollment system and the user device 104 may communicate with each other to enroll the user 102 into biometric verification. For example, the first enrollment system may provide instructions for the user device 104 to display a prompt for the user 102 to enroll into a particular type of biometric verification by providing biometric verification data. For instance, the prompt may indicate for the user 102 to speak some words, a phrase, a sentence, a paragraph, speak for a certain amount of time, and so on (e.g., the displayed prompt may indicate for the user 102 to describe "how to make a peanut butter and jelly sandwich"). Afterwards, the user device 104 may generate biometric enrollment data based on the user 102 speaking. For instance, the user device 104 may record a voice recording of the user 102 and the biometric enrollment data may include the voice recording. Then, the user device 104 may provide the biometric enrollment data to a first enrollment system.

Additionally, and/or alternatively, the user device 104 may generate (e.g., cut) a voice enrollment pattern based on inputting the voice of the user 102 into the voice recreation recipe. For instance, the voice recreation recipe may be an internal reference core model such as one or more mathematical transformations and/or algorithms provided by the enrollment system 108 to the user device 104. The user device 104 may generate/cut a voice enrollment pattern based on inputting the voice of the user 102 into the voice recreation recipe. For instance, based on the voice recreation recipe, the voice enrollment pattern may indicate characteristics of the user's voice such as the frequency, tone, pitch, and so on related to the user's voice. Additionally, and/or alternatively, the voice enrollment pattern may include other information including personal information associated with the user 102 (e.g., the gender of the user 102 and/or the address of the user 102). The user device 104 may generate biometric enrollment data based on the voice enrollment pattern (e.g., the biometric enrollment data may include the voice enrollment pattern indicating the frequency, tone, pitch, and so on related to the user). In some instances, by using the voice enrollment pattern and/or the voice recreation recipe, the user device 104 might not store a voice recording of the user 102 and/or provide the voice recording to the first enrollment system 108

In some examples, the biometric verification may include facial scan verification. For instance, the user device 104 may obtain a facial scan of the user 102 and generate biometric enrollment data based on the facial scan of the user 102 (e.g., generate biometric enrollment data that includes the facial scan of the user 102). In some instances, the biometric verification may include eye or iris verification. For instance, the user device 104 may obtain an eye or iris scan of the user 102 and generate biometric enrollment data based on the eye or iris scan (e.g., generate biometric enrollment data that includes the eye or iris scan of the user 102). In some variations, the biometric verification may include fingerprint scan verification. For instance, the user device 104 may obtain a fingerprint scan of the user 102 and generate biometric enrollment data based on the fingerprint scan of the user 102 (e.g., generate biometric enrollment data that includes the fingerprint scan of the user 102).

In some examples, the biometric enrollment data may include multiple biometric verification types. For instance, the user device 104 may generate biometric enrollment data that includes a fingerprint scan of the user 102 as well as a voice recording of the user 102.

At block 304, based on enrolling the user 102 with the first enrollment system, the user device 104 receives, from the first enrollment system, a first enrollment identifier identifying the first enrollment system. Each of the plurality of enrollment systems 108 is associated with a unique enrollment identifier. To put it another way, the unique enrollment identifier may be capable of identifying the particular enrollment system that enrolled the user 102 into a type of biometric verification (e.g., voice verification). For instance, after the first enrollment system enrolls the user 102 into voice verification, the first enrollment system provides a first enrollment identifier that identifies the first enrollment system as having enrolled the user 102 into voice verification. In some instances, the enrollment identifiers may solely include information indicating the particular enrollment system that enrolled the user 102 (e.g., information indicating the first enrollment system). In other instances, the enrollment identifiers may include further information such as the type of biometric verification (e.g., voice verification) and/or additional information.

At block 306, the user device 104 stores the first enrollment identifier identifying the first enrollment system in a digital wallet of the user 102. For example, each user 102 may have a digital wallet that the user 102 is able to access and store data within. The digital wallet may be a storage location within the user device 104 and may be used to store credentials, credit cards, identification cards, and/or user authentication information. For instance, the digital wallet may store the enrollment identifiers that are used in authenticating the user 102. In some instances, the digital wallet may be a storage location in the cloud computing system 112 and the user device 104 may store the enrollment identifiers within the cloud computing system 112. For example, the user 102 may be assigned a set amount of memory within the cloud computing system 112 for storing the user's information. The digital wallet may be included within the set amount of memory that is used to store the enrollment identifiers.

In other words, referring to blocks 302-306, the user 102 may enroll into biometric verification with one or more of the enrollment systems 108. For instance, when attempting to access a service, the user 102 may install a mobile application onto the user device 104, create an account for the mobile application, and/or log onto the account on the user device 104. For creating the account and/or logging onto the account, the mobile application may indicate for the user 102 to authenticate themselves using biometric verification. However, to protect user's personal information, the enrollment, verification, and/or authentication of the user 102 may be performed by a different entity than the entity that is hosting or managing the content/service (e.g., the mobile application). For instance, an enrollment system may enroll and/or verify the user 102 and a relying party system may host or manage the mobile application.

Initially, the user 102 may enroll into the biometric verification prior to being able to access the service/content provided by the mobile application. The user device 104 may obtain biometric markers/information (e.g., a voice recording or a fingerprint scan) of the user 102 and generate biometric enrollment data based on the obtained biometric marker/information. The user device 104 may then provide the generated biometric enrollment data to an enrollment system (e.g., a first enrollment system). The mobile application may provide instructions that direct the user device 104 as to which enrollment system from the enrollment systems 108 to use for enrolling the user 102. In some instances, the user device 104 may override the mobile application's selection of the enrollment system and select another enrollment system. Additionally, and/or alternatively, the user device 104 may select the enrollment system to use without any feedback from the mobile application.

Afterwards, the enrollment system (e.g., the first enrollment system) may enroll the user 102 into biometric verification using the biometric enrollment data. For instance, the first enrollment system may store the biometric enrollment data (e.g., the voice recording or fingerprint scan of the user 102) into memory and associate the stored biometric enrollment data with the user 102 and/or the user device 104. The first enrollment system may then provide a first enrollment identifier that identifies the first enrollment system and/or the type of biometric verification used for the enrollment. The first enrollment system then provides the first enrollment identifier to the user device 104, and the user device 104 stores the first enrollment identifier into a digital wallet.

In other words, the user 102 may use multiple different mobile applications that are hosted by multiple relying party systems 110. Each of the mobile applications may indicate for the user 102 to verify themselves prior to granting access to the content/services provided by the mobile application.

Instead of having to enroll into biometric verification for each of the mobile applications (e.g., having a 1 to 1 ratio of biometric verification for each of the mobile applications), the enrollment of one mobile application may be used for one or more other mobile applications. For instance, for a second mobile application hosted by a second relying party system, the user device 104 may use the first enrollment identifier as well as the first enrollment system to gain access to the content/service provided by the second mobile application/second relying party system.

To put it another way, the digital wallet may store one or more enrollment identifiers, and each of these enrollment identifiers indicating a particular enrollment system may be used to authenticate the user 102 for one or more mobile applications/relying party systems. For instance, rather than using multiple enrollment systems for a particular type of biometric verification (e.g., voice verification), the number of enrollment systems that are used may be drastically reduced (e.g., one enrollment system for voice verification). Additionally, and/or alternatively, a single enrollment system may be used to enroll the user 102 into multiple types of biometric verification, which may further reduce the number of enrollment systems that are used for biometric verification. By reducing the number of enrollment systems that are used, this may reduce the chance/risk of malicious entities obtaining the user's personal information such as a voice recording of the user 102 and/or fingerprint scan of the user 102.

Furthermore, in some instances, using enrollment identifiers for the enrollment systems may also provide the user 102 more control of their own personal information. For example, rather than having the mobile application or relying party system dictate the enrollment system that is used for enrolling the user 102 into the biometric verification. The user 102/user device 104 may be able to select the enrollment system that is used for the biometric verification. This grants the user 102 more control over their own data and personal information.

At block 308, in response to a request to access content on a relying party system, the user device 104 provides a biometric marker of the user 102 and the first enrollment identifier from the digital wallet of the user to the relying party system. For instance, the user 102 may seek to access content on a relying party system (e.g., a service provided by the relying party system such as a mobile application that is hosted by the relying party system). The user device 104 may provide a request to the relying party system. As described above, the relying party system may host and/or manage a mobile application, and the requested content may be content associated with the mobile application. However, the requested content is not limited to content associated with the mobile application. For instance, the requested content may be content from a website or webpage. Additionally, and/or alternatively, the content may be other types of content that is hosted and/or managed by a relying party system (e.g., by a server).

In response to the request, the relying party system may provide a prompt that attempts to authenticate the user 102 using one or more biometric verification methods and/or procedures. Based on the prompt, the user 102 may select a particular biometric verification method (e.g., voice verification). The user device 104 may then display a prompt that indicates for the user 102 to provide a biometric marker (e.g., a voice recording of the user 102 saying a particular phrase or a fingerprint/facial scan of the user 102). The prompt may be automatically displayed based on the user selected biometric verification. Additionally, and/or alternatively, the user device 104 may provide the biometric verification selection to the relying party system, and the relying party system may direct the user device 104 to display a prompt indicating for the user 102 to provide a biometric marker associated with the selection.

In some variations, the relying party system may indicate the particular type of biometric verification method to use for the verification. For instance, the relying party system may indicate that it would like to use voice verification for the verification method, and for the user 102 to provide a voice recording for the voice verification.

Further, the user device 104 retrieves an enrollment identifier (e.g., the first enrollment identifier) from the digital wallet associated with the user 102. For example, the digital wallet may be a storage location within the user device 104 and the user device 104 may retrieve the enrollment identifier from the storage location. Additionally, and/or alternatively, the digital wallet may be stored within the cloud computing system 112. The user device 104 may retrieve the enrollment identifier from the cloud computing system 112.

In some instances, the user device 104 may determine a particular enrollment identifier to retrieve based on the indicated biometric verification method. For instance, the user 102 may select voice verification or the relying party system may indicate voice verification. The user device 104 may determine an enrollment identifier that is associated with voice verification. For example, the user device 104 may determine the first enrollment identifier indicating the first enrollment system that the user 102 has previously enrolled into voice verification. The user device 104 may then retrieve the first enrollment identifier from the digital wallet. Similarly, the user device 104 may retrieve a second enrollment identifier associated with a second enrollment system that the user has enrolled into fingerprint verification. Additionally, and/or alternatively, the digital wallet may store multiple enrollment identifiers for a single verification method (e.g., voice verification). For instance, the user 104 may enroll into voice verification with both the first enrollment system associated with the first enrollment identifier and the second enrollment system associated with the second enrollment identifier. In such instances, the user device 104 may retrieve, from the digital wallet, both enrollment identifiers and provide them to the requesting relying party system 110. The relying party system 110 may then determine the enrollment systems associated with the enrollment identifiers and select one of the enrollment systems to authenticate the user 102. Additionally, and/or alternatively, the relying party system 110 might not be associated or connected with the enrollment system identified from the enrollment identifier that is provided by the user device 104. For instance, the relying party system 110 might not trust or have been in communication before with a particular enrollment system that is identified by the enrollment identifier. As such, the relying party system 110 may provide instructions to the user device 104 for the user 102 to enroll with a new (e.g., trusted) enrollment system. The new enrollment system may provide the user 102/the user device 104 with an enrollment identifier associated with the new enrollment system, and the user 102/the user device 104 may use the new enrollment identifier for future biometric verifications/authentications.

At block 310, based on the relying party system identifying the first enrollment system using the first enrollment identifier and verifying the biometric marker of the user 102 with the first enrollment system, the user device 104 accesses the requested content associated with the relying party system. For example, the relying party system may identify or determine the enrollment system that is indicated by the received enrollment identifier. Then, the relying party system may communicate with the identified enrollment system (e.g., the first enrollment system) to verify the user 102. For instance, the relying party system may provide the biometric marker of the user 102 to the first enrollment system. The first enrollment system may retrieve the previously stored biometric enrollment data and compare the biometric enrollment data to the biometric marker (e.g., the previously stored voice recording obtained at block 302 with the new voice recording obtained at block 308). Based on the comparison, the first enrollment system may determine whether the user 102 is authenticated. Based on the user 102 not being authenticated, the first enrollment system may provide information indicating that the user 102 is not authenticated to the relying party system and/or directly to the user device 104. Additionally, and/or alternatively, the relying party system may forward the indication that the user 102 is not authenticated to the user device 104. Based on the user 102 being authenticated, the first enrollment system may provide information indicating that the user 102 is authenticated to the relying party system. The relying party system grants access to the content/services to the user 102, and the user device 104 then accesses the requested content (e.g., log onto a mobile application on the user device 104 to order groceries, schedule pick-ups of prescriptions, select or modify insurance policies, and so on).

As such, among other advantages, the present application provides benefits such as providing the user 102 more control over their own personal information and reducing the risk of malicious entities obtaining the user's personal information. Furthermore, in some variations, using enrollment identifiers for the enrollment systems may further streamline the verification process for gaining access to content on a relying party system. For instance, by using enrollment identifiers, the user 102 might not need to enroll into biometric verification when attempting to access new content/services provided by the relying party system. For example, the user device 104 may use an enrollment identifier in the digital wallet of the user rather than having the user 102 provide new biometric markers each time the user 102 is attempting to access service or content on a new relying party system. This may make it simpler and more user friendly for the user 102 to access new services/content.

Additionally, the present application provides enrollment systems 108 that can be re-used for numerous relying party systems 110. As such, by using enrollment identifiers, a plurality of different entities or enterprise organizations may share the same enrollment systems 108 for voice or other types of biometric verifications. The enrollment identifiers may also be shared in a secure method (e.g., if a malicious entity steals the enrollment identifier, the malicious entity is still not in control of the user's actual biometric information or other personal information). Furthermore, this may enhance the user experience as the user may use one authentication/verification for numerous different entities. For instance, one mobile application may enroll the user 102 into a voice verification, and multiple other mobile applications may use the same voice verification. As such, the user 102 may only need to enroll into voice verification once for all of these mobile applications rather than enrolling into voice verification for each one separately.

In some variations, the process 300 may be performed by one or more user devices. For example, the enrollment blocks (e.g., blocks 302-306) may be performed by a first user device and the verification blocks (e.g., blocks 308 and 310) may be performed by a second user device. For instance, the user 102 may use a computer to enroll into biometric verification with a first enrollment system. Then, the user 102 may use a mobile application to access content on a relying party system.

Figure 4A:
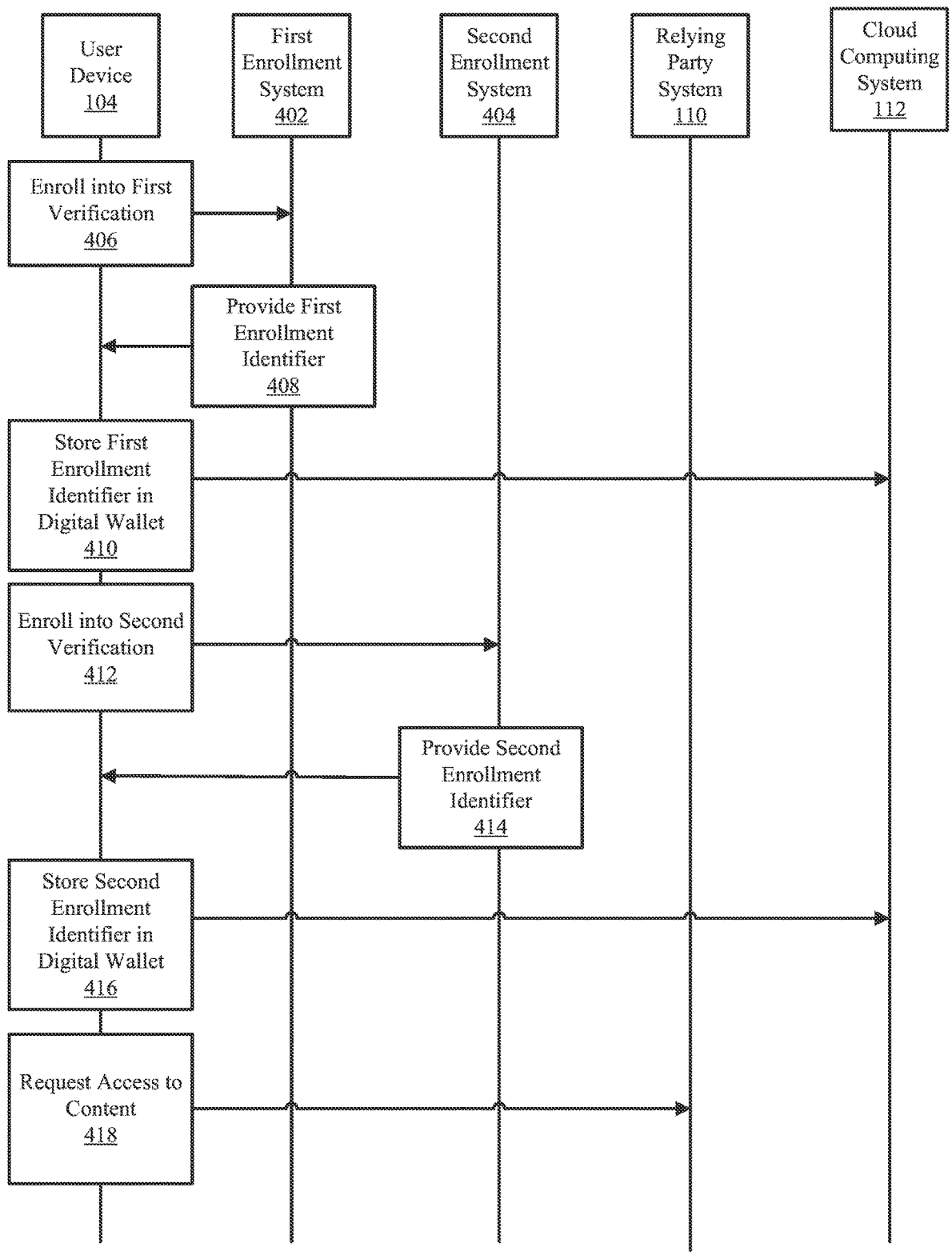
FIGS. 4A and 4B show an exemplary event sequence for using identifiers of enrollment systems for user authentication in accordance with one or more examples of the present application.
Figure 4B:
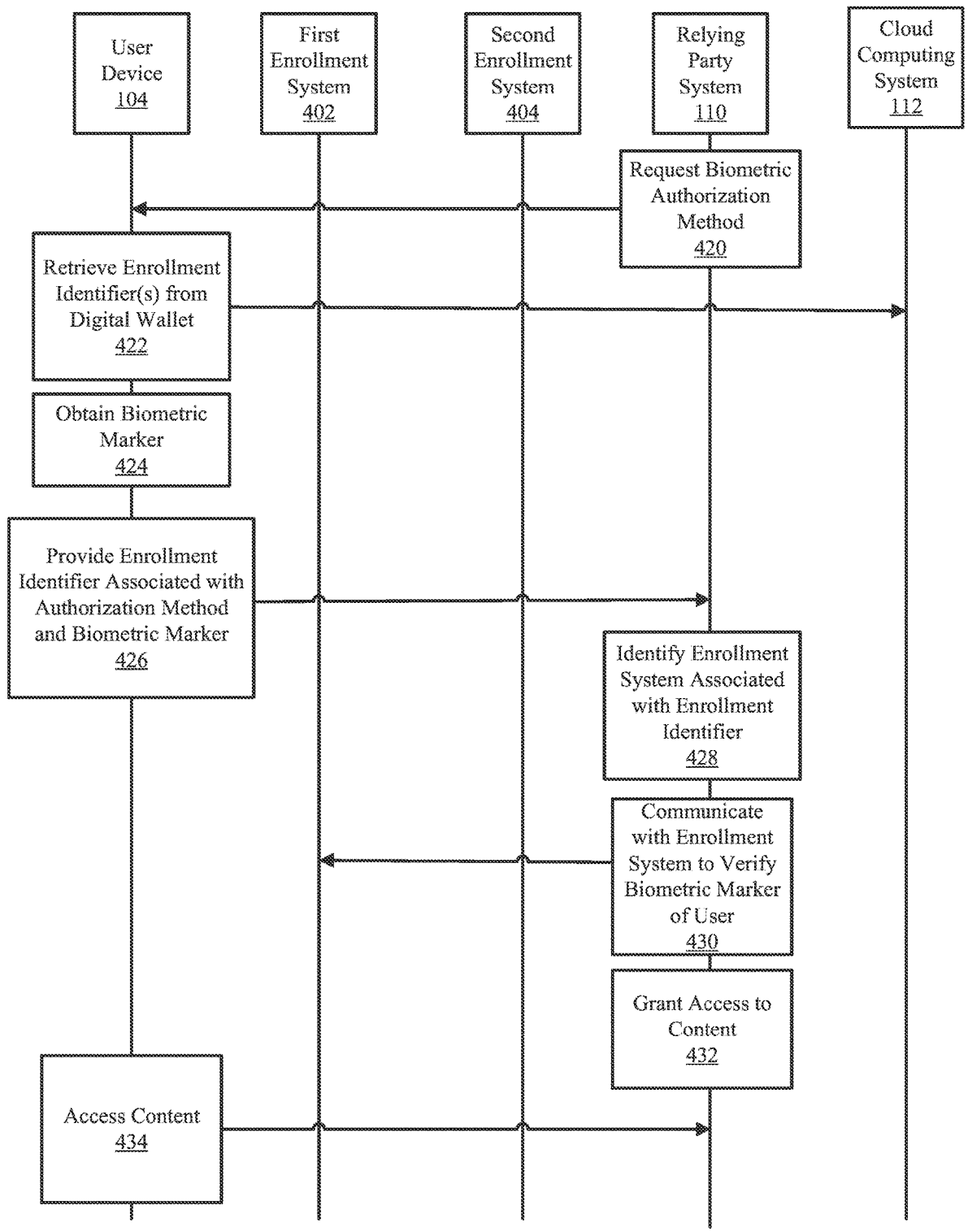

FIGS. 4A and 4B show an exemplary event sequence 400 for using identifiers of enrollment systems for user authentication in accordance with one or more examples of the present application. However, the event sequence 400 is merely an example and other types of event sequences are contemplated herein including by performing any of the following blocks in any suitable order.

Referring to FIG. 4A, at block 406, the user device 104 enrolls into first verification. For example, the user device 104 provides information (e.g., first biometric enrollment data) to the first enrollment system 402 to enroll into first verification. The first verification may be associated with a particular type of verification such as voice verification. At block 408, the first enrollment system 402 provides a first enrollment identifier to the user device 104. The first enrollment identifier may indicate that the first enrollment system 402 enrolled the user 102 into voice verification. At block 410, the user device 104 stores the first enrollment identifier in a digital wallet. For instance, the user device 104 provides the first enrollment identifier to a cloud computing system 112. The cloud computing system 112 includes a digital wallet for the user 102, and stores the first enrollment identifier into the digital wallet.

At block 412, the user device 104 enrolls into second verification. For example, the user device 104 provides information (e.g., second biometric enrollment data) to the second enrollment system 404 to enroll into second verification. The second verification may be associated with a particular type of verification such as fingerprint verification. At block 414, the second enrollment system 404 provides a second enrollment identifier to the user device 104. The second enrollment identifier is different from the first enrollment identifier. In particular, the second enrollment identifier may indicate that the second enrollment system 404 enrolled the user 102 into fingerprint verification. At block 416, the user device 104 stores the second enrollment identifier in a digital wallet. For instance, the user device 104 provides the second enrollment identifier to a cloud computing system 112, and stores the second enrollment identifier into the digital wallet of the cloud computing system 112. As such, the digital wallet may include the first enrollment identifier and the second enrollment identifier. In some instances, the digital wallet may include additional enrollment identifiers (e.g., a third enrollment identifier associated with a third enrollment system that enrolled the user into facial verification).

At block 418, the user device 104 requests content associated with a relying party system 110. For example, the user device 104 provides a request for content to the relying party system 110. The content may be content on a mobile application that is hosted or managed by the relying party system 110. In some instances, the content may be other types of content that is hosted or managed by the relying party system 110.

Referring to FIG. 4B, at block 420, the relying party system 110 provides a request for a biometric authorization or verification method to the user device 104. For instance, the relying party system 110 may provide a list of biometric verification methods (e.g., voice verification, fingerprint verification, facial verification, and so on), and a prompt indicating for the user 102 to select from the list.

At block 422, the user device 104 retrieves enrollment identifier(s) from the digital wallet. In particular, the user device 104 retrieves one or more enrollment identifiers from the digital wallet within the cloud computing system 112. The user device 104 may determine which enrollment identifier to retrieve based on the user selection. For instance, the first enrollment identifier may be associated with voice verification with the first enrollment system 402 and the second enrollment identifier may be associated with fingerprint verification with the second enrollment system 404. The user device 104 may determine and retrieve the first enrollment identifier based on the user 102 selecting voice verification as the biometric verification method to use for verifying the user 102.

At block 424, the user device 104 obtains a biometric marker of the user 102. For instance, the user device 104 may obtain a voice recording for the user 102. At block 426, the user device 104 provides the enrollment identifier associated with the authorization method (e.g., the first enrollment identifier) and the biometric marker to the relying party system 110.

At block 428, the relying party system 110 identifies an enrollment system associated with the enrollment identifier. For instance, the relying party system 110 identifies the first enrollment system 402 based on the first enrollment identifier. At block 430, the relying party system 110 communicates with the first enrollment system 402 to verify the biometric marker of the user 102. For instance, the relying party system 110 may provide the biometric marker to the first enrollment system 402. The first enrollment system 402 may verify/authenticate the user 102 based on the biometric marker. For instance, the first enrollment system 402 may compare the biometric marker (e.g., the voice recording) with a stored biometric marker (e.g., a previous voice recording). Based on the comparison, the first enrollment system 402 may provide an indication as to whether the user 102 is authenticated to the relying party system 110.

At block 432 and based on the indication that the user 102 is authenticated, the relying party system 110 grants access to the content. At block 434, the user device 104 accesses the content.

In some instances, a trusted platform module (TPM) within the user device 104 may be used for verifying the user 102. For instance, the digital wallet may be within the TPM of the user device 104, and may store the enrollment identifiers.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law. Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method for authenticating a user, comprising:
providing, by a user device, first biometric enrollment data of the user to a first enrollment system of a plurality of enrollment systems;
receiving, by the user device and from the first enrollment system, a first enrollment identifier identifying the first enrollment system, wherein each of the plurality of enrollment systems is associated with a unique enrollment identifier;
storing, by the user device, the first enrollment identifier identifying the first enrollment system into a digital wallet of the user, wherein the digital wallet of the user is controlled by the user and is within a trusted platform module (TPM) of the user device or a cloud computing system, both of which are separate from the first enrollment system;
in response to a request to access content on a relying party system, receiving, by the user device and from the user, a biometric marker of the user, and providing, by the user device, the biometric marker of the user and the first enrollment identifier from the digital wallet of the user to the relying party system based on a user selection between a first biometric verification process associated with the first enrollment identifier and a second biometric verification process associated with a second enrollment identifier, wherein the second enrollment identifier is associated with a second enrollment system of the plurality of enrollment systems, and wherein the first biometric verification process and the second biometric verification process are both associated with the same biometric marker; and based on the relying party system identifying the first enrollment system using the first enrollment identifier and verifying the biometric marker of the user with the first enrollment system, accessing, by the user device, the requested content associated with the relying party system.

2. The method of claim 1, further comprising:
providing third biometric enrollment data of the user to a third enrollment system of the plurality of enrollment systems;
receiving, by the user device and from the third enrollment system, a third enrollment identifier identifying the third enrollment system, wherein the third enrollment system is different from the first enrollment system; and
storing, by the user device, the third enrollment identifier identifying the third enrollment system into the digital wallet of the user.

3. The method of claim 2, wherein the first biometric enrollment data is associated with a first biometric verification process and the third biometric enrollment data is associated with a third biometric verification process, wherein the first biometric verification process is different from the third biometric verification process.

4. The method of claim 3, wherein the first biometric verification process is a voice verification process.

5. The method of claim 3, wherein the first biometric verification process is a fingerprint verification process.

6. The method of claim 3, wherein the first biometric verification process is a facial recognition verification process.

7. The method of claim 3, wherein the first biometric verification process is an eye scan verification process.

8. The method of claim 2, further comprising:
causing, by the user device, display of a list of biometric verification processes;
receiving the user selection of a biometric verification process from the list of biometric verification processes; and
retrieving, by the user device, the first enrollment identifier from the digital wallet, wherein providing the biometric marker and the first enrollment identifier to the relying party system is further based on retrieving the first enrollment identifier from the digital wallet.

9. A system, comprising:
a user device configured to:
provide first biometric enrollment data of the user to a first enrollment system of a plurality of enrollment systems;
receive, from the first enrollment system, a first enrollment identifier identifying the first enrollment system, wherein each of the plurality of enrollment systems is associated with a unique enrollment identifier;
store the first enrollment identifier identifying the first enrollment system into a digital wallet of the user, wherein the digital wallet of the user is controlled by the user and is within a trusted platform module (TPM) of the user device or a cloud computing system, both of which are separate from the first enrollment system;
in response to a request to access content on a relying party system, receive from the user the biometric marker of the user and provide the biometric marker of the user and the first enrollment identifier from the digital wallet of the user to the relying party system based on a user selection between a first biometric verification process associated with the first enrollment identifier and a second biometric verification process associated with a second enrollment identifier, wherein the second enrollment identifier is associated with a second enrollment system of the plurality of enrollment systems, and wherein the first biometric verification process and the second biometric verification process are both associated with the same biometric marker; and
based on the relying party system identifying the first enrollment system using the first enrollment identifier and verifying the biometric marker of the user with the first enrollment system, access the requested content associated with the relying party system; and
the first enrollment system configured to:
receive the first biometric enrollment data of the user;
generate the first enrollment identifier based on the first biometric enrollment data; and
provide the first enrollment identifier to the user device.

10. The system of claim 9, wherein the user device is further configured to:
provide third biometric enrollment data of the user to a third enrollment system of the plurality of enrollment systems;
receive, from the third enrollment system, a third enrollment identifier identifying the third enrollment system, wherein the third enrollment system is different from the first enrollment system; and
store the third enrollment identifier identifying the third enrollment system into the digital wallet of the user.

11. The system of claim 10, wherein the first biometric enrollment data is associated with a first biometric verification process and the third biometric enrollment data is associated with a third biometric verification process, wherein the first biometric verification process is different from the third biometric verification process.

12. The system of claim 11, wherein the first biometric verification process is a voice verification process.

13. The system of claim 11, wherein the first biometric verification process is a fingerprint verification process.

14. The system of claim 11, wherein the first biometric verification process is a facial recognition verification process.

15. The system of claim 11, wherein the first biometric verification process is an eye scan verification process.

16. A user device comprising:
one or more processors; and
a non-transitory computer-readable medium having processor-executable instructions stored thereon, wherein the processor-executable instructions, when executed by the one or more processors, facilitate:
providing first biometric enrollment data of the user to a first enrollment system of a plurality of enrollment systems;
receiving, from the first enrollment system, a first enrollment identifier identifying the first enrollment system, wherein each of the plurality of enrollment systems is associated with a unique enrollment identifier;
storing the first enrollment identifier identifying the first enrollment system into a digital wallet of the user, wherein the digital wallet of the user is controlled by the user and is within a trusted platform module (TPM) of the user device or a cloud computing system, both of which are separate from the first enrollment system;
in response to a request to access content on a relying party system, receiving, by the user device and from the user, a biometric marker of the user, and providing the biometric marker of the user and the first enrollment identifier from the digital wallet of the user to the relying party system based on a user selection between a first biometric verification process associated with the first enrollment identifier and a second biometric verification process associated with a second enrollment identifier, wherein the second enrollment identifier is associated with a second enrollment system of the plurality of enrollment systems, and wherein the first biometric verification process and the second biometric verification process are both associated with the same biometric marker; and based on the relying party system identifying the first enrollment system using the first enrollment identifier and verifying the biometric marker of the user with the first enrollment system, accessing the requested content associated with the relying party system.

17. The method of claim 1, wherein the request to access content on the relying party system further comprises:

a request from the relying party system for biometric verification, and wherein providing, by the user device, the biometric marker of the user and the first enrollment identifier is in response to the request from the relying party system for biometric verification.

18. The system of claim 9, wherein the request to access content on the relying party system further comprises a request from the relying party system for biometric verification, and wherein the user device configured to provide the biometric marker of the user and the first enrollment identifier is further configured to:

in response to the request from the relying party system for biometric verification, provide the biometric marker of the user and the first enrollment identifier.

19. The system of claim 18, wherein the user device is further configured to:

cause display of a list of biometric verification processes;

receive the user selection of a biometric verification process from the list of biometric verification processes; and retrieve the first enrollment identifier from the digital wallet, wherein providing the biometric marker and the first enrollment identifier to the relying party system is based on retrieving the first enrollment identifier from the digital wallet.

20. The method of claim 1, wherein the first biometric verification process is different from the second biometric verification process.

* * * * *